United States Patent
Fluck et al.

(10) Patent No.: US 6,837,498 B2
(45) Date of Patent: Jan. 4, 2005

(54) SEALING SYSTEM FOR AN ASSEMBLY

(75) Inventors: Tobias Fluck, Immenstadt (DE); Philipp Spies, Hemmersdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/332,378

(22) PCT Filed: Jun. 16, 2001

(86) PCT No.: PCT/DE01/02240
§ 371 (c)(1),
(2), (4) Date: Sep. 29, 2003

(87) PCT Pub. No.: WO02/04845
PCT Pub. Date: Jan. 17, 2002

(65) Prior Publication Data
US 2004/0036232 A1 Feb. 26, 2004

(30) Foreign Application Priority Data
Jul. 8, 2000 (DE) .......................... 100 33 348

(51) Int. Cl.[7] ............................... F16J 15/02
(52) U.S. Cl. .................... 277/630; 277/591; 277/637; 277/638; 277/639; 277/641
(58) Field of Search ................ 277/590–591, 277/598, 628, 630, 637–639, 641–642

(56) References Cited

U.S. PATENT DOCUMENTS

| | | | | |
|---|---|---|---|---|
| 4,192,520 A | * | 3/1980 | Hasegawa | 277/591 |
| 4,501,432 A | * | 2/1985 | Kuniyoshi et al. | 277/591 |
| 4,625,978 A | * | 12/1986 | Jelinek | 277/641 |
| 4,796,896 A | * | 1/1989 | Anderson, Jr. | 277/637 |
| 5,301,958 A | * | 4/1994 | Covington | 277/641 |
| 6,048,041 A | * | 4/2000 | Mueller et al. | 303/119.2 |
| 6,224,058 B1 | * | 5/2001 | Drebing et al. | 277/313 |

FOREIGN PATENT DOCUMENTS

JP 05288116 A * 11/1993 ............ F02F/11/00

* cited by examiner

*Primary Examiner*—Alison Pickard
*Assistant Examiner*—Vishal Patel
(74) *Attorney, Agent, or Firm*—Ronald E. Greigg

(57) ABSTRACT

One part of an assembly has one wall with a face-end groove in which a rubber-elastic seal is disposed. In the unstressed state, the seal protrudes past two groove cheeks of the groove. The groove cheek toward the outside is provided with a luglike protrusion while the groove cheek toward the inside has a lesser height than the groove cheek and is wedge-shaped in cross section. The protrusion of the outside groove cheek together with the seal forms a sealing device, whose action in the stressed state is based on the one hand on the plastic deformation of the protrusion on a face of a second part and on the other on the high pressure of the seal in the groove.

6 Claims, 1 Drawing Sheet

SEALING SYSTEM FOR AN ASSEMBLY

CROSS-REFERENCE TO RELATED APPLICATIONS

This application is a 35 USC 371 application of PCT/DE 01/02240 filed on Jun. 16, 2001.

BACKGROUND OF THE INVENTION

1. Field of the Invention

The invention is directed to an improved sealing device for a hydraulic assembly.

2. Description of the Prior Art

One sealing device of the type with which this invention is concerned is already known (German Patent Disclosure DE 195 35 235 A1), in which a covering hood of a hydraulic assembly, on the free edge of its outer wall, has a groove extending all the way around, in which a separately injection-molded rubber-elastic seal rests with sealing lips. The groove is defined by groove cheeks of different heights: One groove cheek located toward the outside of the wall is higher than a groove cheek toward the inside. The outer groove cheek superficially engages a flat face end of a valve block of the hydraulic assembly. The inner groove cheek, with its flat end face, engages the seal and maintains the contact of this seal with the valve block. While the rubber-elastic seal statically seals off the interior of the covering hood, the outer groove cheek is intended to prevent a jet of steam of water, for instance, from a high-pressure cleaning device from reaching the seal. However, because of variations in production or installation, a superficial engagement of the outer groove cheek along the entire length of the outer wall of the covering hood is not always assured.

SUMMARY OF THE INVENTION

The sealing device of the invention has the advantage over the prior art that because of the deformation of the luglike protrusion, variations between the two parts of the assembly can be compensated for in a simple way, while the wedge-shaped groove cheek makes it more difficult for the seal to creep outward. Thus on the one hand, by means of the luglike protrusion on the outer groove cheek, a secure closure of a gap between the parts of the assembly to prevent against the penetration of liquids or foreign bodies is achieved; on the other, by means of the wedge-shaped groove cheek, the seal is largely restrained in the groove, so that it can be subjected to a high pressure, which reinforces its sealing action. Nevertheless, a partial volume of the seal can overcome the wedge-shaped groove cheek to allow the two parts of the assembly to move toward one another far enough that the luglike protrusion impacts on its counterpart face. The rounded tip of the wedge-shaped groove cheek prevents the partial volume of the seal that has been positively displaced from the groove from being sheared off.

BRIEF DESCRIPTION OF THE DRAWINGS

The foregoing and other features of the invention will be apparent from the detailed description contained herein below, taken with the drawings, in which.

DESCRIPTION OF THE PREFERRED EMBODIMENT

Figure 3:
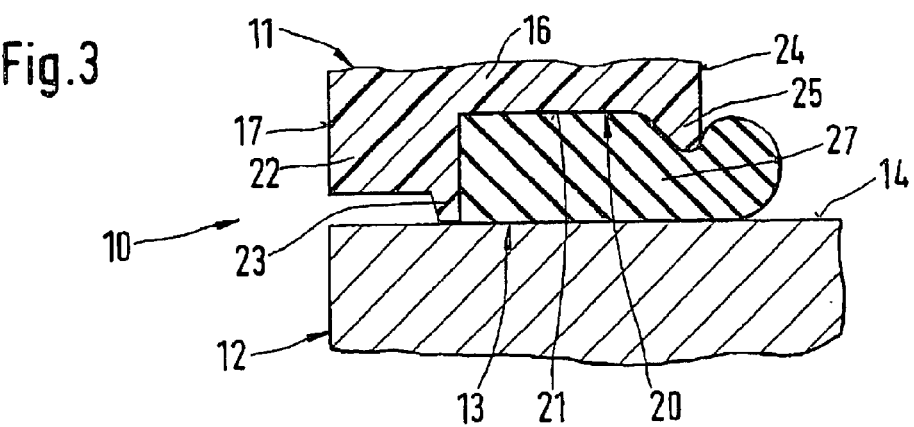
FIG. 3 is a section corresponding to FIG. 2, with a cap mounted on a different part of the assembly.

An assembly 10 shown only in part in FIG. 3 of the drawings comprises two parts 11 and 12, of which the part 11 embodied as a cap is provided with a sealing device 13. The other part 12 of the assembly 10 is a valve block, with a flat face 14 for engagement by the sealing device 13.

Figure 1:
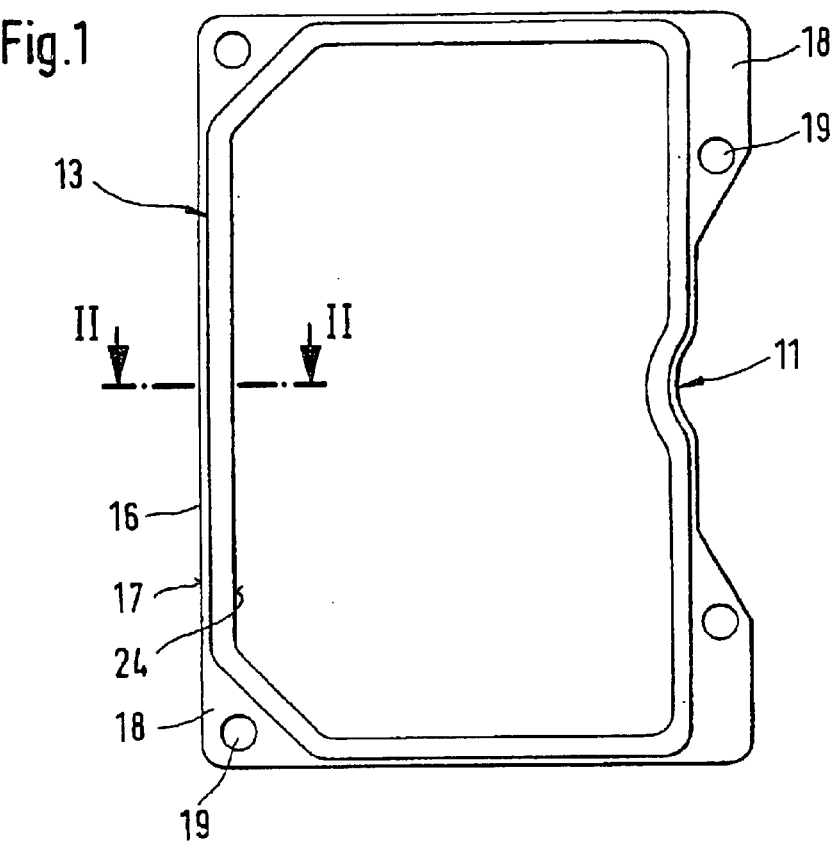
FIG. 1 is an elevation view of one part, embodied as a cap, of an assembly, with a sealing device on the face end extending all the way around.
Figure 2:
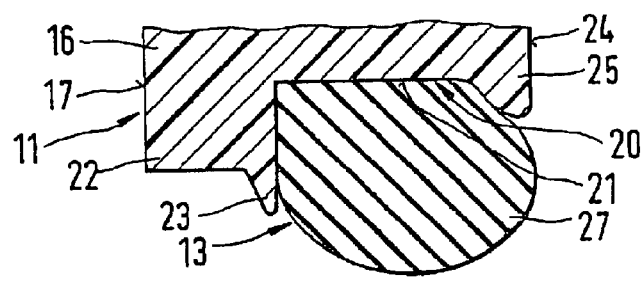
FIG. 2 is a section taken along the line II—II of FIG. 1 through the sealing device of the cap, on a larger scale.

The part 11 shown in FIG. 1 before being mounted on part 12 has an encompassing wall 16, which is equipped on its outside 17 with flangelike extensions 18 as well as fastening holes 19 in the extensions for screwing part 11 to part 12, an operation not shown in the drawing. The sealing device 13 is embodied on the face end of this wall 16. The wall 16 has a groove 20, extending along the face end, which is open toward the part 12 and whose flat bottom 21 extends parallel to the face 14 of the part 12 (FIGS. 2 and 3). Toward the outside 17 of the wall 16, the groove 20 is bounded by a groove cheek 22. Immediately adjacent the groove 20, a luglike protrusion 23 of relatively slender cross section is formed onto the groove cheek 22, beginning at the free face end thereof. The luglike protrusion 23 extending along the entire circumference of the wall 16 contributes to a small extent to the height of the groove cheek 22, or the depth of the groove 20. On the inside 24 of the wall 16, the groove 20 is bounded by a groove cheek 25, which beginning at the bottom 21 rises to at most half the groove depth or a maximum of half the height of the groove cheek 22. The inner groove cheek 22 is embodied in cross section as a wedge, which extends with one side in alignment with the wall 16. The groove cheek 22 has a rounded tip and with its other side extends at a wedge angle of approximately 45° into the bottom 21 of the groove 20. The groove cheek 25, like the groove cheek 22, extends along the entire circumference of the wall 16 of the part 11, which part has been injection-molded from a glass-fiber-reinforced thermoplastic.

A self-contained rubber-elastic seal 27 is disposed, extending all the way around, in the groove 20 of the wall 16. This seal comprises silicone rubber, which is placed in the groove 20 by a manipulator-guided dispenser. The seal 27, which after the silicone rubber has hardened is essentially incompressible, has the contour shown in FIG. 2. The seal 27 has a cross section (FIG. 2) that both fills up the groove 20 and, in the unstressed state, protrudes approximately semicircularly past the two groove cheeks 22 and 25.

For installation, the part 11 is placed on the part 12 and screwed to it. In the course of the ensuing approach of the part 11 to the face 14 of the part 12, the rubber-elastic seal 27 is deformed and is forced back in the direction of the bottom 21 of the groove 20. In the process, some of its volume is positively displaced (FIG. 3) out of the groove 20 toward the inside 24 of the wall 16. As the screwing operation continues, the luglike protrusion 23 of the groove cheek 22 strikes the plane 14 of the part 12 and undergoes plastic deformation. The screwing operation is concluded once it is assured that taking production and dimensional variations into account, the protrusion 23 with plastic deformation engages the face 14 of the part 12 over the entire length of the wall 16. During the screwing operation, the groove cheek 25 exerts a resistance, which increases with an increasing approach to the face 14, to the lateral escape of the seal 27 from the groove 20. As a consequence, as the spacing between the tip of the groove cheek 25 and the face 14 of the part 12 lessens, there is increasing pressure on the volume of the seal 27 located in the groove 20, which increases the sealing action of the seal. The shape of the groove cheek 25 prevents the partial volume of the seal 27 that has been positively displaced out of the groove 20 from being sheared off.

The overall action of the sealing device 13 comprises two individual actions: First, the protrusion 23, plastically deformed at the face 14 of the part 12 provides sealing, and second, the rubber-elastic seal 27 provides sealing by engagement with the face 14. The protrusion 23 located toward the outside of the wall 16, as an element of the sealing device 13, prevents a steam or water jet of a high-pressure cleaning device, for instance, from reaching the rubber-elastic seal 27. This seal 27 that forms the second element of the sealing device 13, because of its high pressure, prevents liquids or foreign substances from creeping underneath to reach the inside 24 of the wall 16. The sealing device 13 can withstand heavy loads of the kind that occur for instance in assemblies disposed in an engine compartment of a vehicle.

The foregoing relates to preferred exemplary embodiments of the invention, it being understood that other variants and embodiments thereof are possible within the spirit and scope of the invention, the latter being defined by the appended claims.

We claim:

1. A sealing device (13) for sealing an assembly (10) which comprises two parts (11, 12), of which one part (11) is provided with the sealing device (13), while the other part (12) has a face (14) which is engaged by the sealing device (13):

the sealing device (13) being embodied on the face end of one wall (16) of the first part (11) and having a groove (20), which extends along the face end and is bounded on both sides by groove cheeks (22, 25);

the groove cheek (22) located toward the outside (17) of the wall (16) being braced on the face (14) of the second part (12), while the groove cheek (25) located toward the inside (24) of the wail (16) extends with spacing from the face (14);

a rubber-elastic seal (27) disposed in the groove (20), which seal in the unstressed state protrudes past both groove cheeks (22, 25) and in the stressed state is forced back at least approximately as far as the groove cheek (22) toward the outside, the groove cheek (22) toward the outside having a protrusion (23) of luglike cross section, adjoining the groove (20), which protrusion, by plastic deformation, engages the face (14) of the second part (12);

the groove cheek (25) toward the inside is embodied in cross section as a wedge, which has a rounded tip and which comes to an end at its wedge angle in a bottom (21), embodied as flat, of the groove (20).

2. The sealing device of claim 1, wherein the seal (27) is essentially incompressible and in the unstressed state has a cross section that not only fills up the groove (20) but also at least approximately semicircularly protrudes past the two groove cheeks (22, 25).

3. The sealing device of claim 2, wherein the seal (27) comprises silicone rubber.

4. The seating device of claim 1, wherein the groove cheek (25) toward the inside protrudes upward from the bottom (21) of the groove (20) to at most half the depth of the groove.

5. The sealing device of claim 1, wherein the bottom (21) of the groove (23) extends at least approximately parallel to the face (14) of the second part (12).

6. The sealing device of claim 4, wherein the bottom (21) of the groove (20) extends at least approximately parallel to the face (14) of the second part (12).

* * * * *

UNITED STATES PATENT AND TRADEMARK OFFICE
CERTIFICATE OF CORRECTION

PATENT NO. : 6,837,498 B2
DATED : January 4, 2005
INVENTOR(S) : Tobias Fluck et al.

It is certified that error appears in the above-identified patent and that said Letters Patent is hereby corrected as shown below:

<u>Title page,</u>
Item [56], References Cited, FOREIGN PATENT DOCUMENTS, please add the following reference:
-- DE 197 36 431 A    3/1999 --

Signed and Sealed this

First Day of March, 2005

JON W. DUDAS
*Director of the United States Patent and Trademark Office*